US011768630B1

(12) United States Patent
Avron et al.

(10) Patent No.: US 11,768,630 B1
(45) Date of Patent: Sep. 26, 2023

(54) CREDIT BASED MEMORY SCHEDULER

(71) Applicant: Amazon Technologies, Inc., Seattle, WA (US)

(72) Inventors: Itai Avron, Sunnyvale, CA (US); Anat Arbely, Tirat Carmel (IL)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 17/452,548

(22) Filed: Oct. 27, 2021

(51) Int. Cl.
*G06F 3/06* (2006.01)
*G06F 13/16* (2006.01)

(52) U.S. Cl.
CPC .......... *G06F 3/0659* (2013.01); *G06F 3/0604* (2013.01); *G06F 3/0679* (2013.01); *G06F 13/1668* (2013.01)

(58) Field of Classification Search
CPC .... G06F 3/0659; G06F 3/0604; G06F 3/0679; G06F 12/0835; G06F 13/16; G06F 13/1647; G06F 13/1668; G06F 13/1689
See application file for complete search history.

(56) References Cited

U.S. PATENT DOCUMENTS

| | | | | |
|---|---|---|---|---|
| 9,785,578 | B2 * | 10/2017 | Brittain | G06F 13/1631 |
| 11,483,260 | B2 * | 10/2022 | Jalal | H04L 49/15 |
| 2022/0197563 | A1 * | 6/2022 | Lam | G06F 3/0679 |

OTHER PUBLICATIONS

ARM® Developer: AMBA® 5 CHI Architecture Specification (ARM IHI 0050E.b—Fifth public release), Aug. 16, 2021, 508 pages <URL: https://developer.arm.com/documentation/ihi0050/latest> [retrieved Sep. 22, 2021].

* cited by examiner

*Primary Examiner* — Idriss N Alrobaye
*Assistant Examiner* — Richard B Franklin
(74) *Attorney, Agent, or Firm* — Weaver Austin Villeneuve & Sampson LLP

(57) ABSTRACT

A memory controller can receive transactions from an interconnect to access the memory. The memory controller can use a credit-based scheme to request the interconnect to send specific memory transactions that can be scheduled in a desirable order using a credit type associated with each transaction. In some embodiments, the memory controller can keep track of the number of transactions directed to each bank of the memory based on a credit type, so that specific transactions directed towards the underutilized banks can be requested and scheduled in a manner to utilize all the banks more uniformly to improve the system performance.

20 Claims, 6 Drawing Sheets

100

CREDIT BASED MEMORY SCHEDULER

BACKGROUND

A memory controller can receive transactions from various source nodes via an interconnect fabric to access a memory. The memory may include a plurality of banks. The memory controller may include a scheduler to schedule the transactions that may be directed to different banks of the memory. Within a given time window, some of the banks may receive a higher number of transactions directed to them than some other banks, which can impact the system performance.

BRIEF DESCRIPTION OF THE DRAWINGS

Various embodiments in accordance with the present disclosure will be described with reference to the drawings, in which.

DETAILED DESCRIPTION

Figure 1:
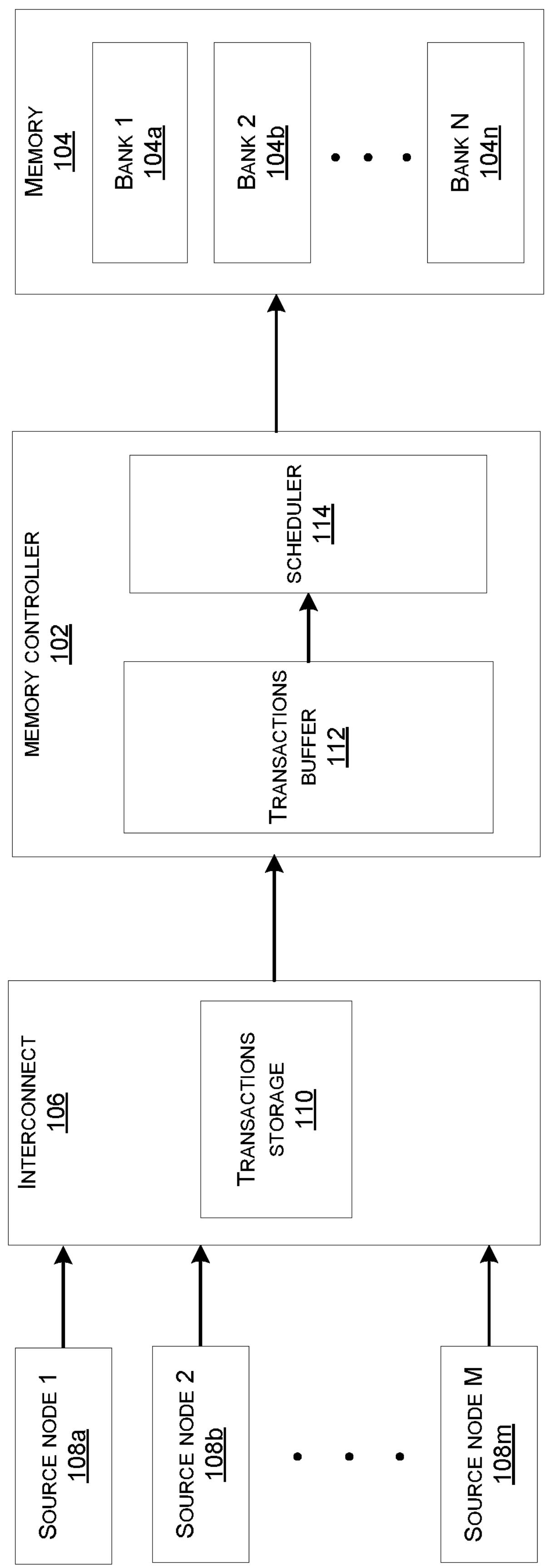
FIG. 1 illustrates a system comprising a memory controller, which can be used to describe some embodiments.

In some systems, a memory controller for a memory may include a scheduler to schedule memory transactions initiated by a plurality of source nodes. The source nodes may include processors, peripheral devices, coprocessors (e.g., graphics processing units (GPUs), accelerator engines, crypto engines), direct memory access (DMA) controllers, or input/output (I/O) controllers, among others. As an example, the memory controller can be on a system-on-a-chip (SoC), which may also include an interconnect fabric coupled to the memory controller and to the plurality of source nodes. The memory controller may also include a buffer to hold a set of outstanding memory transactions that need to be scheduled. The scheduler may attempt to schedule the outstanding memory transactions by optimally balancing the latency and the bandwidth for accesses to the memory. As an example, the memory may comprise several banks and a single page can be accessed in each bank. In order to achieve high utilization, it may be desirable to operate on all the banks more evenly.

In most cases, scheduling of the memory transactions may be limited by the number of outstanding memory transactions that are held in the buffer of the memory controller, or by the non-uniform distribution of the memory transactions among the memory banks (e.g., some banks may have a higher number of memory transactions than some other banks). Thus, high bandwidth may not be achieved at certain points in time when the buffer doesn't hold any transactions to some of the banks. In most systems, the buffer size may be limited due to area and timing constraints in the memory controller. Furthermore, probability of the buffer holding the transactions to all the banks may depend upon the system traffic and address mapping between the system address to the memory address (e.g., which system addresses are mapped to the memory banks). Thus, on average, some banks may be underutilized in a specific time window, which can cause performance drop.

One solution to improve the scheduler efficiency may include increasing the size of the buffer to allow more transactions to be stored, which can provide flexibility to the scheduler to schedule the transactions optimally among all the banks. However, increase in the buffer size may not be always cost effective since it may increase the chip area and power consumption. Increasing the buffer size may be especially expensive in timing and area, when the buffer is implemented as a content addressable memory (CAM), since the scheduler may have to search all the CAM entries simultaneously for optimally scheduling the transactions to all the banks.

Another solution to improve the scheduler efficiency may include adding another buffer before the memory controller to gather more transactions, and sending specific memory transactions (e.g., transactions to the underutilized banks) from this additional buffer to the memory controller. However, this solution may require modifying the memory controller to determine ordering between transaction requests from various source nodes (e.g., Point-of-Serialization (PoS)), which is generally implemented within the interconnect. Alternatively, the PoS can be implemented external to the memory controller, which may affect the read latency since read-after-write hazards have to be checked for read transactions.

Thus, it would be desirable for the scheduler to have access to a large number of transactions in order to increase the probability of having transactions that are directed to underutilized banks. In some systems, transactions originated from various source nodes may be stored in an interconnect fabric on the SoC before they are directed to different targets. For example, in some systems, an interconnect fabric coupled between the memory controller and the plurality of source nodes may store the transactions initiated by various sources nodes before directing the transactions to corresponding targets. An example interconnect fabric may be based on a coherent hub interface (CHI) protocol such as Advanced High Performance Bus (AMBA) CHI protocol.

In some embodiments, the memory controller can rely on the large number of transactions being stored in the interconnect fabric (or simply the interconnect) for optimally scheduling the transactions to access the memory. Certain embodiments can be used to utilize the memory banks efficiently by controlling the order in which the memory transactions are scheduled for accessing the memory. In various embodiments, the memory controller can keep track of the current transactions being processed so that it can request the interconnect to send specific memory transactions that can be scheduled in a desirable order. For example, the memory controller can keep track of the number of transactions directed to each bank, so that specific transactions directed towards the underutilized banks can be requested and scheduled to utilize all the banks in a uniform manner to improve the system performance.

When a transaction is received by the memory controller, the memory controller may map the transaction address to a physical address of one of the memory banks. In some embodiments, the memory controller may categorize or associate each incoming transaction to correspond to a credit type from a set of credit types. Each credit type may be associated with a particular memory bank, or a specific group of transactions. The memory controller can be configured to schedule the transactions based on the credit type. In some embodiments, the memory controller can schedule the transactions based on the respective credit types such that all the memory banks can be utilized more evenly to improve the system performance. In some embodiments, the specific group of transactions may include read transactions to a certain bank, write transactions to a certain bank, prioritized or mission critical transactions, or other categories of transactions that may need to be scheduled in a desirable order.

In some instances, the memory controller may have limited resources or insufficient storage to hold the current transaction until some earlier transactions have completed. The resources may be used to schedule the transactions for accessing the memory. In some embodiments, the memory controller may reserve resources per credit type. Each transaction received by the memory controller may be processed to determine whether there are resources available to schedule the transaction based on the credit type. If there are no resources available to schedule the transaction for that credit type, the memory controller can transmit a rejection packet back to the interconnect indicating that the transaction associated with that credit type was not accepted. The rejection packet may include a credit type indicating that the interconnect was granted a credit for the transaction with that credit type. The memory controller can keep track of the rejected transactions by incrementing a respective credit counter for each credit type that was rejected.

The interconnect can keep track of the rejected transactions based on the associated credit types for each rejected transaction. Once the resources are available to schedule that transaction and the credit counter associated with that credit type is non-zero, the memory controller can transmit a retry request packet to the interconnect to resend that transaction. The retry request packet may also include the same credit type indicating that the retry request is for the transaction with that credit type. The interconnect can resend that transaction with the same credit type identifying use of the credit for the transaction. The memory controller can now accept and process the transaction for scheduling the access to the memory. The memory controller can decrement the associated credit counter after accepting the transaction on the retry attempt.

In some embodiments, the request retry mechanism of the CHI protocol can be used to request specific transactions for scheduling. Generally, the Quality-of-Service (QoS) field in the transaction packet is used for the request retry mechanism to accept or retry a transaction. When the memory controller has limited resources and insufficient storage to hold the current transaction of a specific credit type, the memory controller may not accept the transaction request, and instead transmit the rejection packet for a retry acknowledge (RetryAck) response to the interconnect indicating that a credit was granted to the interconnect for a retry request in the future. The RetryAck response may include a protocol credit type (PCrdType) field to indicate the credit type assigned by the memory controller for that transaction. At a later point in time, when the resources become available, the memory controller may transmit the retry request packet for a protocol credit grant (PCrdGrant) response comprising the PCrdType to indicate to the interconnect that the transaction with that credit type can be resent. The interconnect can resend the transaction request with the PCrdType field set to the same value as in the RetryAck response of the original transaction indicating allocation of the credit. The memory controller has to accept the transaction in the second attempt and schedule the transaction to access the memory.

Scheduling of the transactions can be controlled by configuring the credit types to appropriate values. For example, by configurating the credit types to correspond to the memory banks, utilization of the memory banks can be improved. In other examples, the credit types can be configured to schedule the transactions in a desirable order for a group of transactions. Thus, in various embodiments, the system performance can be improved using the available protocols and without the need for any additional hardware.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a system 100 comprising a memory controller 102, which can be used to describe some embodiments. The memory controller 102 may be coupled to an interconnect 106 and a memory 104. The interconnect may also be coupled to a plurality of source nodes comprising a source node 1 108*a*, a source node 2 108*b*, and a source node M 108*m*. In various examples, the system 100 may be used to provide services such as analytics, cloud computing, deployment services, storage, databases, application development, or web services, among others. The system 100 may also include other components based on the functionality supported by the system 100, which are not shown here for the ease of simplicity. In some examples, some components of the system 100 may be part of a system-on-a-chip (SoC).

The memory 104 may comprise a plurality of memory banks including a bank 1 104*a*, a bank 2 104*b*, and a bank N 104*n*. In some examples, the N banks can be part of one or more ranks. The memory 104 may include a dynamic random access memory (DRAM), synchronous DRAM (SDRAM), or a double data rate (DDR) SDRAM. Other configurations or types of the memory 104 are also possible without deviating from the scope of the disclosed technologies. In various embodiments, the interconnect 106, the memory 104, and the memory controller 102 may be part of the same chip or different chips.

In some implementations, one or more sources nodes 108*a*-108*m* may be coupled to the interconnect 106 via a bridge, hub, or another interconnect. Some example source nodes 108*a*-108*m* may include processors, GPUs, accelerator engines, crypto engines, DMA engines, peripheral devices, or I/O controllers, among others. The source nodes 108*a*-108*m* may be configured to initiate transactions for accessing the memory 104, which may be directed to the memory controller 102 by the interconnect 106. The memory controller 102 or the memory 104 may function as a target node for the transaction requests received via the interconnect 106 to access the memory. Note that the interconnect 106 may also be coupled to other target nodes which are not shown here for the ease of simplicity. In some examples, some of the source nodes 108*a*-108*m* may also function as target nodes based on the type of the transaction.

The interconnect 106 may include a transactions storage 110 to store the transactions received from various source nodes 108*a*-108*m* before directing the transactions to different target nodes. The transactions storage 110 may include any type of memory suitable for storing the transactions (e.g., registers, DRAMs, SRAMs, etc.). The interconnect 106 may be implemented using a mesh, a crossbar, or a ring, and include other components based on the implementation. The interconnect 106 may be configured to facilitate the transactions between various source nodes and target nodes. In some examples, the interconnect 106 may send the transactions received from the source nodes to the appropriate target nodes as a requester, receive the response from the target nodes, and send the response back to the source nodes.

The memory controller 102 may be configured to hold the transactions received from the interconnect 106 in a transactions buffer 112 for accessing the memory 104. A scheduler 114 may be configured to schedule the transactions stored in the transactions buffer 112 by optimally balancing the latency and the bandwidth for accesses to the memory 104. In some instances, a single page can be accessed in each of the banks 104*a*-104*n*, thus, it may be desirable to operate on all the N banks simultaneously in order to achieve high utilization. However, scheduling of the memory transactions may be limited by the number of outstanding transactions held in the transactions buffer 112, or by the non-uniform distribution of the transactions among the N banks (e.g., some banks may have a higher number of transactions scheduled than some other banks). Thus, higher bandwidth may not be achieved at certain points in time when the transactions buffer 112 doesn't hold any transactions to some of the banks, which can reduce the system performance.

When the number of transactions held by the transactions buffer 112 is small due to size limitations of the transactions buffer 112, the scheduler 114 may not have sufficient number of transactions to search through in order to schedule the outstanding transactions to the N banks efficiently while optimizing the latency and the bandwidth for the memory accesses. Furthermore, probability of the transactions buffer 112 holding the transactions to all the N banks may depend upon the system traffic, and address mapping between the system addresses to the memory addresses. Thus, on average, some banks may be underutilized in a specific time window, which can cause performance drop.

In some implementations, size of the transactions buffer 112 can be increased to allow more transactions to be stored, which can provide flexibility to the scheduler 114 to schedule the transactions optimally among the N banks. However, increasing the size of the transactions buffer 112 may not be always cost effective since it may increase the chip area and/or the power consumption. Increasing the size of the transactions buffer 112 may be especially expensive in the timing and the area, when the transactions buffer 112 is implemented as a CAM, since the scheduler 114 may have to search all the CAM entries simultaneously for optimally scheduling the transactions to all the N banks.

In some implementations, an additional buffer can be added between the memory controller 102 and the interconnect 106 to gather more transactions, and sending specific memory transactions (e.g., transactions to the underutilized banks) from this additional buffer to the memory controller 102. However, this solution may require modifying the memory controller 102 to determine the ordering between the transaction requests from various source nodes (e.g., Point-of-Serialization (PoS)), which is generally implemented within the interconnect 106. Alternatively, the PoS can be implemented external to the memory controller 102, which may affect the read latency since read-after-write hazards have to be checked for the read transactions.

Certain embodiments can be used to improve the system efficiency for scheduling accesses to the memory by relying on the large number of transactions stored in the transactions storage 110. In some embodiments, the system efficiency can be improved by utilizing the memory banks 104*a*-104*n* uniformly by controlling the order in which transactions to different banks are scheduled. The memory controller 102 can keep track of the current transactions being processed so that it can request the interconnect 106 to send specific memory transactions from the transactions storage 110 that are directed to the underutilized memory banks. For example, the memory controller 102 can keep track of the number of transactions directed to each of the N banks, so that specific transactions directed towards the underutilized banks can be requested and scheduled to utilize all the N banks in a uniform manner.

In some embodiments, the memory controller 102 may categorize each incoming transaction to correspond to a credit type from a set of credit types. Each credit type may be associated with a specific bank from the N banks, or a specific group of transactions. The memory controller 102 may be configured to schedule the transactions based on the credit type. In different embodiments, the credit types may be defined to control scheduling of the transactions in a desirable order such as a particular sequence of transactions (e.g., specific to underutilized banks, round-robin across the different banks, or other suitable or desired sequence), or a particular type of transactions (e.g., read only or write only). In some examples, the credit type may be defined such that the memory controller 102 may schedule the transactions to improve utilization of all the N banks, which can ultimately improve the system performance.

In various embodiments, a credit-based scheme can be used to request specific transactions from the interconnect 106, which can be scheduled in a desirable order. In some embodiments, the memory controller 102 may reserve resources per credit type. For example, the resources may be used to hold the transaction in the transactions buffer 112 for scheduling the transaction by the scheduler 114 to access the memory 104. Each transaction received by the memory controller 102 may be processed to determine whether there are corresponding resources available to schedule the transaction based on the associated credit type. If there are no resources available for that credit type, the transaction can be rejected, and a credit can be awarded to the interconnect 106 for resending the transaction. In some embodiments, a respective credit counter can be used by the memory controller 102 to keep track of the number of credits associated with each credit type.

At a later point in time, when the resources for that credit type become available, the memory controller 102 can send a retry request to the interconnect 106 to send the transaction again based on the available credit for that credit type. The interconnect 106 can resend the transaction based on the credit allocation, which the memory controller 102 can accept in the second attempt. In some examples, the interconnect 106 may receive multiple retry requests for different transactions and may resend the transactions in out-of-order. In some examples, the interconnect 106 may store a plurality of transactions associated with the same credit type, and send any transaction associated with that credit type.

In some embodiments, the interconnect 106 may use a coherent hub interface (CHI) protocol, and the request retry mechanism of the CHI protocol can be used to request specific transactions for scheduling. Generally, the Quality-of-Service (QoS) field in the packet for the transaction request is used for the request retry mechanism to accept or retry a transaction. Instead of implementing the retry mechanism based on the QoS, the techniques disclosed herein use the retry mechanism to schedule transactions based on the availability of the resources for a specific credit type. The communication between the interconnect 106 and the memory controller 102 using the credit-based scheme is further described with reference to FIG. 2.

Figure 2:
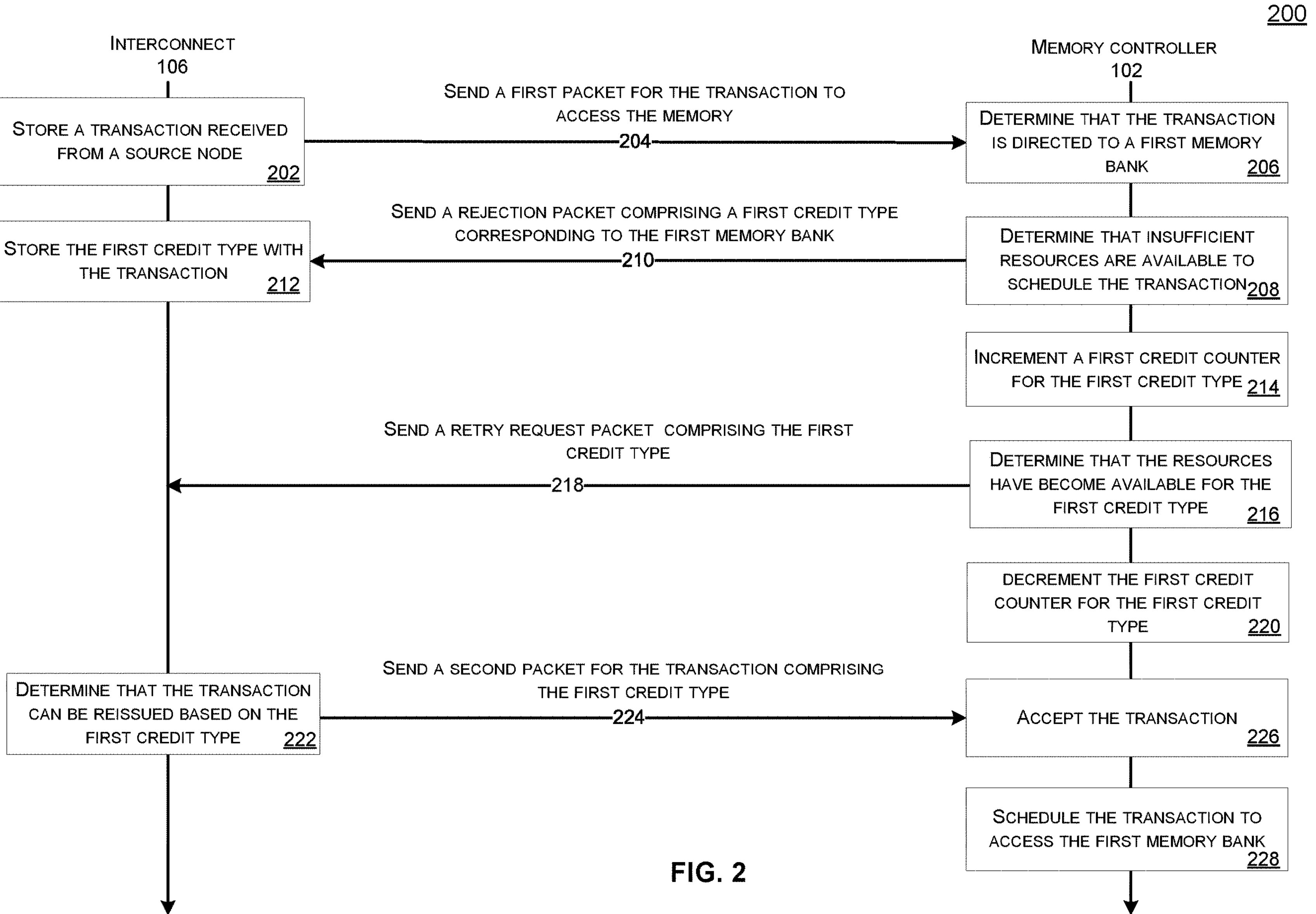
FIG. 2 illustrates communication between an interconnect and the memory controller, according to some embodiments.

FIG. 2 illustrates communication between the interconnect 106 and the memory controller 102, according to some embodiments.

In step 202, the interconnect 106 may store a transaction received from a source node. As an example, the source node can be the source node 1 108*a* from the source nodes 108*a*-108*m* in FIG. 1. The interconnect 106 can store the transaction in the transactions storage 110 of the interconnect 106 for sending to the appropriate target. For example, the interconnect 106 may determine that the transaction is directed to the memory 104.

In step 204, the interconnect 106 may send a first packet for the transaction to the memory controller 102 to access the memory 104. As an example, the first packet can be an example packet 300, described with reference to FIG. 3A.

Figure 3A:
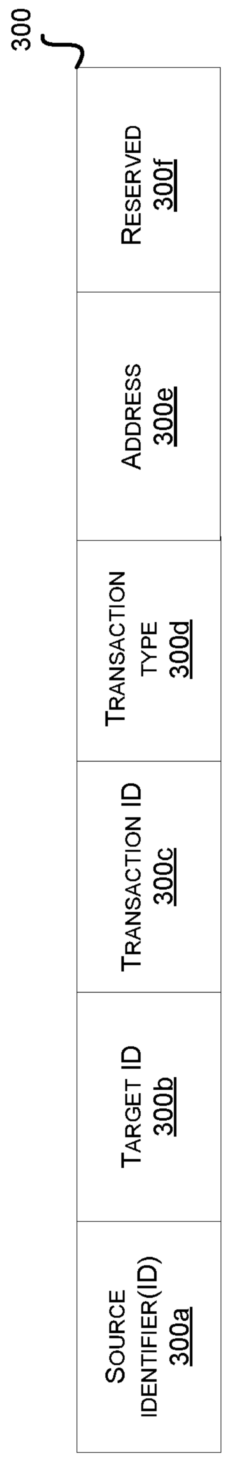
FIG. 3A illustrates an example packet for a transaction received by the memory controller.

As shown in FIG. 3A, the packet 300 may comprise a source identifier (ID) 300*a*, a target ID 300*b*, a transaction ID 300*c*, a transaction type 300*d*, an address 300*e*, a reserved field 300*f*, and any other suitable fields. The source ID 300*a* can be used to identify the source of the transaction. Referring back to FIG. 1, the source can be one of the source nodes 108*a*-108*n*, or the interconnect 106. The target ID 300*b* can be used to identify the target or the completer of the transaction. As an example, the memory controller 102 or the memory 104 can be the target or the completer of the transaction. The transaction ID 300*c* can be used to identify the transaction. The transaction type 300*d* can be used to indicate whether the transaction is a read request, a write request, a rejection message, a resend message, or another type based on the implementation. The address 300*e* can indicate a logical address of the transaction. Referring back to FIG. 2, the memory controller 102 may receive the first packet and decode different fields of the first packet.

In step 206, the memory controller 102 may determine that the transaction is directed to a first memory bank. For example, the memory controller 102 may map the address 300*e* to a physical address of the bank1 104*a*. The memory controller 104 may also categorize or associate the transaction to correspond to a first credit type associated with the bank1 104*a*.

In step 208, the memory controller 102 may determine that there are insufficient resources to schedule the transaction. The memory controller 102 may determine that the resources reserved for the first credit type are already in use. For example, the transactions buffer 112 may already be holding transactions that are scheduled to access the bank1 104*a*, or the transactions buffer 112 may not have sufficient storage to store the current transaction for scheduling. The memory controller may also determine that there are insufficient resources to schedule the transaction when a disproportionately large number of transactions have been issued to the first memory bank in a time window as compared to the other memory banks.

In step 210, the memory controller 102 may send a rejection packet to the interconnect 106 comprising the first credit type corresponding to the first memory bank. As an example, the rejection packet can be an example packet 302, described with reference to FIG. 3B. The example packet 302 may be sent by the memory controller 102 to the interconnect 106 comprising a rejection message to reject the transaction based on the first credit type, e.g., the resources associated with the first credit type are not available to schedule the current transaction.

Figure 3B:
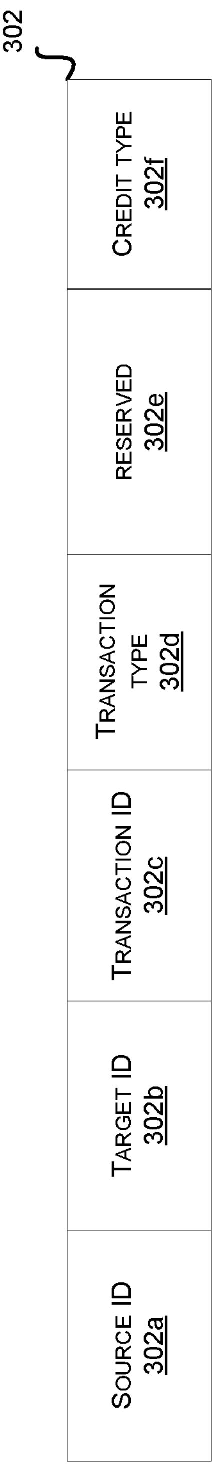
FIG. 3B illustrates an example packet comprising a rejection message transmitted by the memory controller.

As shown in FIG. 3B, the example packet 302 may include a source ID 302*a*, a target ID 302*b*, a transaction ID 302*c*, a transaction type 302*d*, a reserved field 302*e*, a credit type 302*f*, and any other suitable fields. The source ID 302*a* can be used to identify the memory controller 102 as the source of the rejection message. The target ID 302*b* can be used to identify the interconnect 106 as the target or recipient of the rejection message. The transaction ID 302*c* can be used to identify the transaction associated with this rejection message. In some examples, a value of the transaction ID 302*c* can be the same as the value of the transaction ID 300*c* to indicate to the interconnect 106 that the rejection message is associated with the same transaction. The transaction type 302*d* can be used to indicate that the packet 302 corresponds to a rejection message. The credit type 302*f* can be used to indicate that a credit is granted to the interconnect 106 for this specific transaction. The credit type 302*f* can include an indication of the first credit type corresponding to the bank1 104*a*. In some embodiments, when the interconnect 106 is based on the CHI protocol, the retry acknowledge (Retry-Ack) response to the interconnect 106 may include the value of the credit type 302*f* in the protocol credit type (PCrdType) field.

In step 212, the interconnect 106 may store the first credit type with the transaction. For example, the interconnect 106 may hold the information associated with the transaction including the credit type 302*f* in the transactions storage 110 for resending the transaction at a later point in time.

In step 214, the memory controller 102 may increment a first credit counter for the first credit type. Incrementing the first credit counter may indicate that a credit was awarded to the interconnect 106 for the transaction of the first credit type. In some examples, the first credit counter may be assigned to the first credit type for the source node 1 108*a* so that the memory controller 102 can keep track of the credits awarded for the transactions originated from different source nodes.

In step 216, the memory controller 102 may determine that the resources have become available for the first credit type. The memory controller 102 may determine at a later point in time that the resources for the first credit type have become available, e.g., when there are no transactions scheduled for the bank1 104*a* in the memory controller 102, and, therefore, the bank1 104*a* may not be fully utilized in comparison to the other banks. As another example, the memory controller 102 may determine that the resources have become available when the number of transactions issued to the other memory banks have become more proportionate to the number of transactions that have been issued to the first memory bank within a time window.

In step 218, the memory controller 102 may send a retry request packet comprising the first credit type to the interconnect 106 requesting to resend the transaction with the first credit type. For example, the memory controller 102 may determine that the first credit counter has a non-zero value indicating that a transaction with the first credit type, which originated from the first source node, was rejected, and, therefore, the memory controller 102 is allowed a retry request for that transaction with the first credit type. As an example, the retry request packet can be an example packet 304, described with reference to FIG. 3C.

Figure 3C:
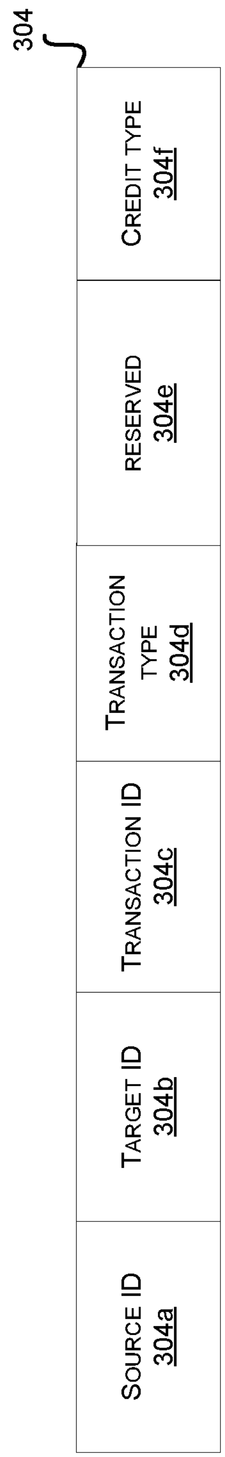
FIG. 3C illustrates an example packet comprising a resend message transmitted by the memory controller.

As shown in FIG. 3C, the example packet 304 may include a source ID 304*a*, a target ID 304*b*, a transaction ID 304*c*, a transaction type 304*d*, a reserved field 304*e*, a credit type 304*f*, and any other suitable fields. The source ID 304*a* can be used to identify the memory controller 102 as the source of the resend message. The target ID 304*b* can be used to identify the interconnect 106 or the source node1 108*a* as the target or recipient of the resend message. The transaction ID 304*c* can be used to identify the transaction associated with this resend message. The transaction type 304*d* can be used to indicate that the packet 304 corresponds to a resend message. The credit type 304*f* can be used to indicate that this credit type was granted to the interconnect 106 for this specific transaction so that the interconnect 106 can send the same transaction again. In some embodiments, when the interconnect 106 is based on the CHI protocol, the protocol credit grant (PCrdGrant) response to the interconnect 106 may include the value of the credit type 304*f* in the protocol credit type (PCrdType) field. For example, the credit type 304*f* may include the first credit type similar to the credit type 302*f* in the rejection packet.

In step 220, the memory controller 102 may decrement the first credit counter for the first credit type. Decrementing the first credit counter may indicate that the memory controller 102 is ready to schedule a transaction for the first credit type. Although step 220 is shown as being after sending the retry request packet, it should be understood that the decrement of the first credit counter is performed in association with the retry request for the first credit type, and that the decrement can occur before, in parallel, or after the retry request has been sent.

In step 222, the interconnect 106 may determine that the transaction can be reissued based on the first credit type. For example, the interconnect 106 may determine that a credit was awarded for the retry request based on the first credit type. In some examples, the interconnect 106 may store a plurality of transactions associated with the first credit type, and send any transaction associated with the first credit type.

In step 224, the interconnect 106 may send a second packet for the transaction comprising the first credit type. For example, the interconnect 106 can assign the credit based on the first credit type in the resend message (e.g., the credit type 304*f*) and resend the transaction. As an example, the second packet can be an example packet 306, described with reference to FIG. 3D.

Figure 3D:
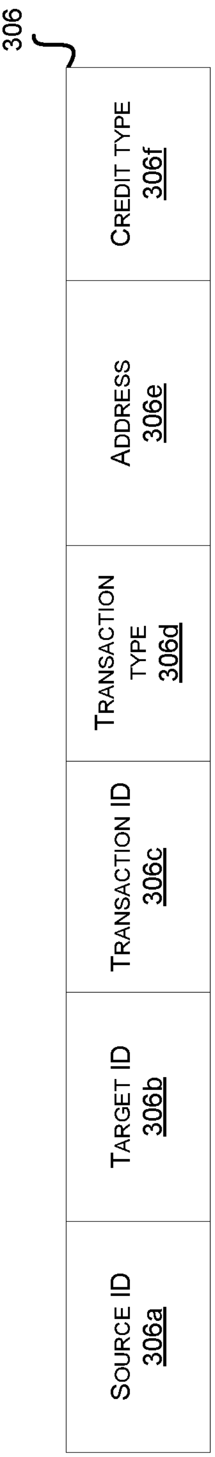
FIG. 3D illustrates an example packet for a resent transaction received by the memory controller.

As shown in FIG. 3D, the example packet 306 may comprise a source ID 306*a*, a target ID 306*b*, a transaction ID 306*c*, a transaction type 306*d*, an address 306*e*, a credit type 306*f*, and any suitable fields. The source ID 306*a* can be used to identify the interconnect 106 or the source node1 108*a*. The target ID 306*b* can be used to identify the memory controller 102 or the memory 104 as the target or recipient of the transaction. The transaction ID 306*c* can be used to identify the resent transaction. The transaction type 306*d* can be used to indicate that the transaction is a read request or a write request to access the memory 104. The address 306*e* can indicate a logical address of the transaction, which can be mapped to a physical address of the bank associated with the credit type 306*f*.

In step 226 the memory controller 102 can accept the transaction. Since the resources reserved for the first credit type have become available, the memory controller 102 can accept the transaction on the second attempt.

In step 228, the memory controller 102 may schedule the transaction to access the first memory bank. The memory controller 102 may schedule the transaction to access the bank1 104*a*. Thus, the bank1 104*a* can be utilized efficiently, and the system performance can be improved.

Figure 4:
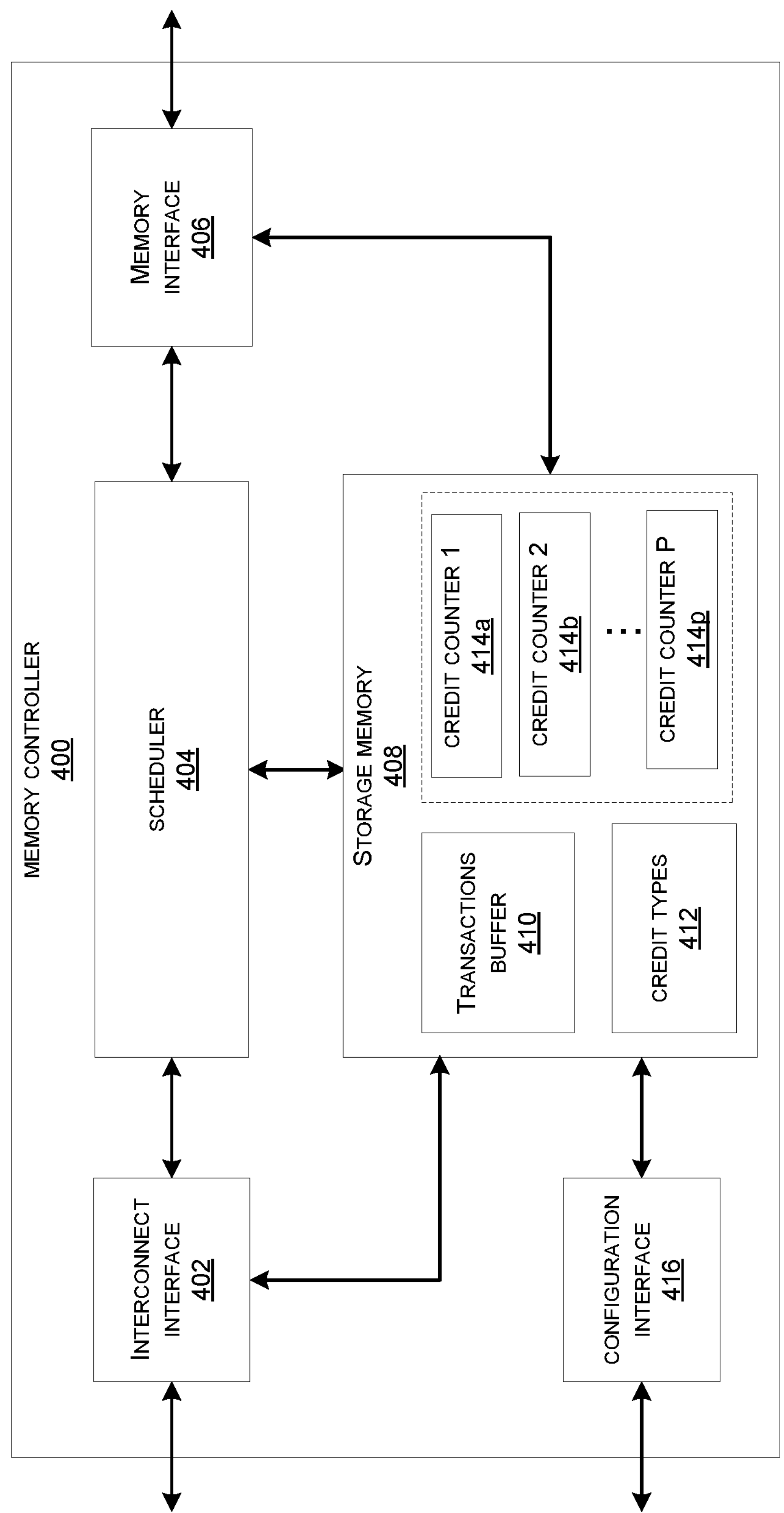
FIG. 4 illustrates a block diagram of the memory controller, according to some embodiments.

FIG. 4 illustrates a block diagram of a memory controller 400 according to some embodiments. The memory controller 400 can be an example of the memory controller 102 in FIG. 1. The memory controller 402 may include an interconnect interface 402, a scheduler 404, a memory interface 406, a storage memory 408, and a configuration interface 416.

The interconnect interface 402 may be configured to receive the transactions from the interconnect 106 and transmit the responses to the interconnect 106 using any suitable interface. For example, the interconnect interface 402 may be configured to receive the first packet for the initial request to perform a transaction, and the second packet to retry the transaction from the interconnect 106, and transmit the rejection packet and the retry request packet to the interconnect 106, as described with reference to FIG. 2. In some implementations, the interconnect interface 402 may be configured to decode the transaction fields, and map the transaction address to one of the banks from the N banks in the memory 104. The interconnect interface 402 may include wires, decoders, encoders, registers, transmitters, receivers, and any other suitable circuitry to facilitate the communication between the memory controller 402 and the interconnect 106.

The storage memory 408 may include a transactions buffer 410, credit types 412, and P credit counters comprising a credit counter1 414*a*, a credit counter2 414*b*, and a credit counter P 414*p*. The storage memory 408 may be used to provide storage for the credit counters, credit types, transactions, and for any other information associated with the transactions using one or more of registers, an SRAM, a DRAM, or a CAM. For example, in some embodiments, the transactions buffer 410 can be implemented using a CAM, and the credit types 412 and the credit counters 414*a*-414*p* can be implemented using registers or other storage medium.

The transactions buffer 410 may be used to hold the transactions for scheduling by the scheduler 404. In some embodiments, the transactions buffer 410 may be configured to reserve space for holding one or more transactions for each transaction type to allow the scheduler 404 to schedule the accesses to the memory 104 more efficiently.

The credit types 412 may include a set of credit types, which can be used by the scheduler 404 to schedule the transactions in a desirable order or preference. In some embodiments, the memory controller 400 can be configured to assign the credit types 412 such that each credit type from the credit types 412 is associated with a particular memory bank, or a specific group of transactions (e.g., read only, write only, prioritized or mission critical, etc.). In some examples, the credit types 412 may include N number of credit types which have one-to-one correspondence with the banks 104*a*-104*n* of the memory 104. As an example, the credit types 412 may include the first credit type represented by the credit types 302*f*, 304*f*, and the 306*f*, described with reference to FIGS. 3B-3D.

The credit counters 414*a*-414*p* can be used to keep track of the number of credits awarded to the interconnect 106 for the transaction requests by counting the rejected transactions for each credit type. For example, each credit counter associated with a credit type can be incremented when the corresponding transaction is rejected, and decremented in association with sending the retry request. In some embodiments, the P credit counters may include M×N credit counters to keep track of the credits for the transactions between the M number of source nodes 108*a*-108*m* and the N number of banks 108*a*-108*n*. For example, one credit counter can be assigned per bank for each source node.

The configuration interface 416 may be used to configure different components of the memory controller 400. In some implementations, the memory controller 400 may be configured by a processor, which can be part of the source nodes 108*a*-108*m*. In some embodiments, the configuration interface 416 can be used to assign each credit type from the credit types 412 to a corresponding bank from the banks 108*a*-108*n*, reserve the resources for each credit type, and initialize the credit counters 414*a*-414*p*, among other tasks.

The scheduler 404 may be configured to schedule the transactions for accesses to the memory 104. In some embodiments, the scheduler 404 may be configured to determine whether an incoming transaction can be accepted or rejected based on whether there are sufficient resources available to schedule the transaction. For example, the transaction may be directed to a specific memory bank based on the address mapping. If the resources reserved for that specific memory bank are insufficient or unavailable, the scheduler 404 may send a rejection packet to the interconnect 106 via the interconnect interface 402. In some implementations, a separate resource manager (not shown) can be used to manage the resources for the memory controller 400.

The scheduler 404 may also be configured to increment a counter associated with a credit type corresponding to the transaction to track that the transaction with that credit type was rejected. The scheduler 404 may also be configured to determine when the resources become available for that credit type, and send a retry request packet to the interconnect 106 via the interconnect interface 402 based on the value of the credit counter. The scheduler 404 can decrement the counter associated with that credit type after or while sending the retry request packet. The scheduler 404 may be configured to accept the transaction being resent when the resources for that credit type are available in order to schedule the transaction. The scheduler 404 may be implemented using state machines, arbiters, decoders, multiplexers, or other suitable circuitry.

The memory interface 406 may be configured to communicate with the memory 104 using any suitable interface based on the memory type. For example, the memory interface 406 can be used by the scheduler 404 to schedule accesses to different banks of the memory 104 such that all the banks are utilized evenly without any dead cycles or bubbles in between the accesses. In some implementations, the scheduler 404 may hold the transactions in the transactions buffer 410 for scheduling the accesses to the memory via the memory interface 406.

Figure 5:
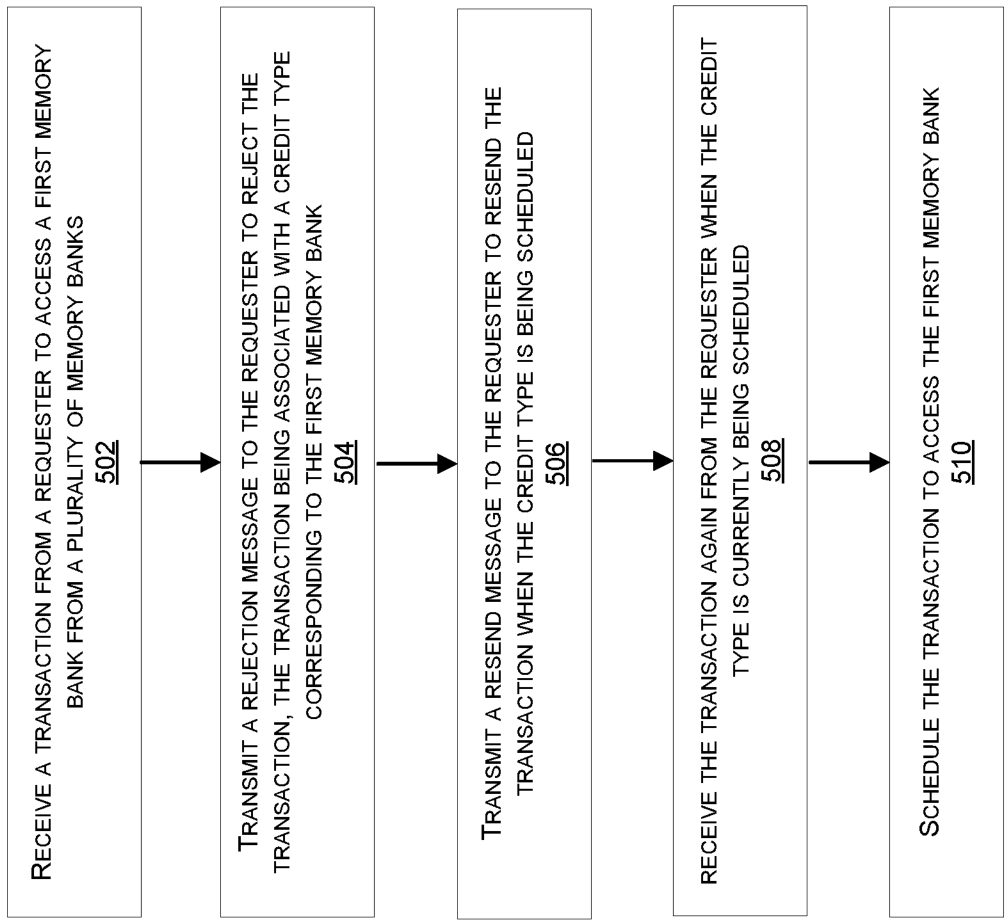
FIG. 5 illustrates a flow chart for a method performed by the memory controller, according to some embodiments.

FIG. 5 illustrates a flow chart 500 for a method performed by a memory controller, according to some embodiments. For example, the method may be performed by the memory controller 102 in FIG. 1.

In step 502, the method may include receiving a transaction from a requester to access a first memory bank from a plurality of memory banks in a memory. For example, the memory controller 102 may receive a transaction to access the bank1 104*a* in the memory 104. The requester can be the interconnect 106, or one of the source nodes from the source nodes 108*a*-108*m*. In some examples, a first packet for the transaction may be received via the interconnect interface 402. The first packet may be similar to the example packet 300 in FIG. 3A. The interconnect interface 402 may decode the fields of the packet 300, and map the address 300*e* to the bank1 104*a*.

In step 504, the method may include transmitting a rejection message to the requester to reject the transaction. The transaction can be associated with a credit type corresponding to the first memory bank. As an example, the transaction can be associated with a first credit type corresponding to the bank1 104*a*. In some implementations, the first credit type from the credit types 412 may be assigned to the bank1 104*a* by the configuration interface 416 based on the mapping. The scheduler 404 may determine that there are insufficient resources available to schedule the transaction for the first credit type, and therefore reject the transaction. For example, the scheduler 404 may send the example packet 302 for the rejection message with the credit type 302*f* set to the first credit type indicating that a credit was granted for the transaction with the first credit type. The example packet 302 may be sent to the interconnect 106 via the interconnect interface 402. The scheduler 404 may also increment the credit counter1 414*a* associated with the first credit type to track that the transaction corresponding to the first credit type was rejected.

In step 506, the method may include transmitting a resend message to the requester to resend the transaction when the credit type is being scheduled. The scheduler 404 may determine that the resources reserved for the first credit type have become available so that the transaction can be scheduled, and therefore transmit the resend message to the requester to resend the transaction. In some examples, the resources reserved for the first credit type may become available when the bank1 104*a* is being underutilized as compared to the other banks. The scheduler 404 may transmit the example packet 304 for the resend message with the credit type 304*f* set to the first credit type so that the requester can resend the transaction based on the first credit type. The example packet 304 may be sent to the interconnect 106 via the interconnect interface 402. The scheduler 404 may also decrement the credit counter1 414*a* indicating that the resend message corresponding to the first credit type is being sent.

In step 508, the method may include receiving the transaction again from the requester when the credit type is currently being scheduled. The scheduler 404 may receive the example packet 306 for the resent transaction via the interconnect interface 402. The example, packet 306 may include the credit type 306*f* set to the first credit type indicating that the credit corresponding to the first credit type has been allocated.

In step 510, the method may include scheduling the transaction to access the first memory bank. The scheduler 404 may schedule the transaction to access the bank1 104*a* via the memory interface 406. For example, the transaction may be held in the transactions buffer 410 for scheduling the access to the bank1 104*a*, and be scheduled to balance utilization of the memory banks. Thus, utilization of the bank1 104*a* can be improved, which can ultimately improve the system performance.

Thus, as discussed with reference to FIGS. 1-5, a credit-based scheme can be used by the memory controller to improve the system performance using the available interface protocols and without the need for any additional hardware. In some embodiments, the request retry mechanism of the CHI protocol can be used to request specific transactions for scheduling, which may be directed to underutilized banks or to a specific transaction type.

Figure 6:
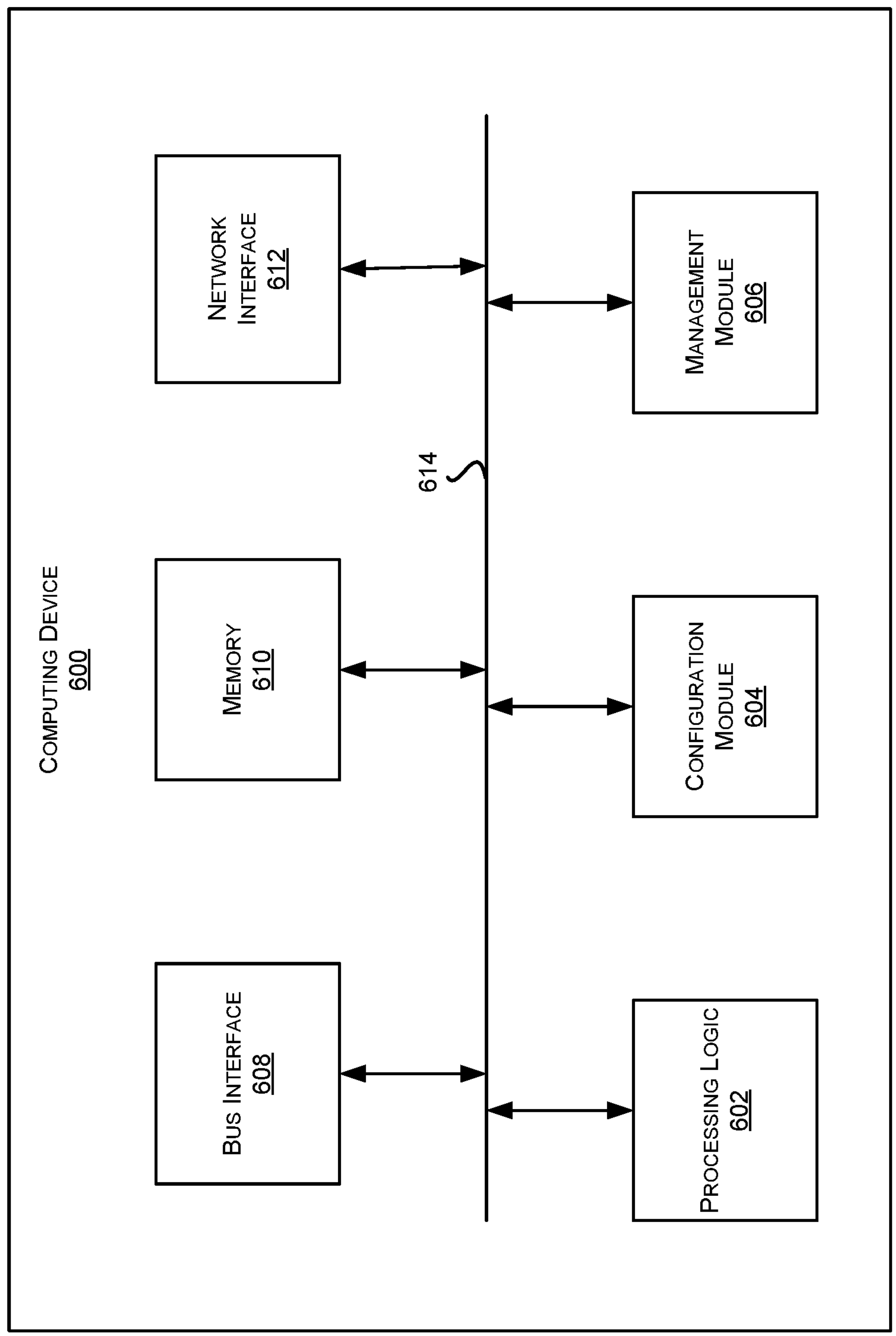
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. The computing device 600 may facilitate processing of packets and/or forwarding of packets from the computing device 600 to another device. As referred to herein, a "packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 600 may be the recipient and/or generator of packets. In some implementations, the computing device 600 may modify the contents of the packet before forwarding the packet to another device. The computing device 600 may be a peripheral device coupled to another computer device, a switch, a router or any other suitable device enabled for receiving and forwarding packets.

In one example, the computing device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, which are not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory may also store and maintain several data structures and routing tables for facilitating the functionality of the computing device 600.

In some implementations, the configuration module 604 may include one or more configuration registers. Configuration registers may control the operations of the computing device 600. In some implementations, one or more bits in the configuration register can represent certain capabilities of the computing device 600. Configuration registers may be programmed by instructions executing in the processing logic 602, and/or by an external entity, such as a host device, an operating system executing on a host device, and/or a remote device. The configuration module 604 may further include hardware and/or software that control the operations of the computing device 600.

In some implementations, the management module 606 may be configured to manage different components of the computing device 600. In some cases, the management module 606 may configure one or more bits in one or more configuration registers at power up, to enable or disable certain capabilities of the computing device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc.

The various components and modules of the computing device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:

an interconnect configured to store a plurality of transactions; and a memory controller configured to:

receive a first packet from the interconnect for a transaction from the plurality of transactions to access a memory, the memory configured to be accessed as individual memory banks;

determine that the transaction is directed to a first memory bank of the memory;

determine whether there are resources available to schedule the transaction to access the first memory bank;

upon determining that there are insufficient resources available to schedule the transaction, send a rejection packet to the interconnect indicating that the transaction is not accepted, the rejection packet comprising a first credit type indicating that the interconnect was granted a credit for the transaction with the first credit type, the first credit type corresponding to the first memory bank;

increment a first counter associated with the first credit type to track that the transaction with the first credit type was rejected;

determine that the resources have become available to schedule the transaction to access the first memory bank;

send a retry request packet to the interconnect to resend the transaction based on the first counter, the retry request packet comprising the first credit type identifying the retry request for the transaction;

decrement the first counter associated with the first credit type indicating that the retry request packet to resend the transaction has been sent;

receive a second packet for the transaction from the interconnect, the second packet comprising the first credit type indicating allocation of the credit; and schedule the transaction to access the first memory bank.

2. The system of claim 1, wherein the interconnect is coupled to a set of source nodes, and the transaction is originated from a first source node in the set of source nodes.

3. The system of claim 1, wherein the resources become available to schedule the transaction when there are fewer transactions scheduled in the memory controller to access the first memory bank in comparison to other memory banks of the memory.

4. The system of claim 1, wherein the interconnect uses a Coherent Hub Interface (CHI) protocol, and wherein the rejection packet corresponds to a retry acknowledge (RetryAck) response, the request packet corresponds to a protocol credit grant (PCrdGrant) response, and the credit type is provided in a protocol credit type (PCrdType) field in the response.

5. A computer-implemented method, comprising, by a memory controller:

receiving a transaction from a requester to access a first memory bank from a plurality of memory banks in a memory;

transmitting a rejection message to the requester to reject the transaction, the transaction being associated with a credit type corresponding to the first memory bank;

transmitting a resend message to the requester to resend the transaction when the credit type is being scheduled;

receiving the transaction again from the requester when the credit type is currently being scheduled; and scheduling the transaction to access the first memory bank.

6. The computer-implemented method of claim 5, wherein the credit type is a first credit type from a set of credit types, and wherein each credit type from the set of credit types corresponds to one of the memory banks in the plurality of memory banks.

7. The computer-implemented method of claim 5, wherein the resend message is transmitted when a utilization of the first memory bank is lower than other memory banks of the plurality of memory banks.

8. The computer-implemented method of claim 5, wherein the credit type is part of a set of credit types that are used to schedule the transactions based on a sequence.

9. The computer-implemented method of claim 5, further comprising:

prior to receiving the transaction from the requester, reserving resources for each credit type from a set of credit types to schedule the transaction, wherein transmitting the rejection message to the requester includes determining that there are no resources available to schedule the transaction corresponding to the credit type.

10. The computer-implemented method of claim 5, further comprising:

prior to transmitting the resend message, incrementing a counter associated with the credit type to track that the transaction corresponding to the credit type was rejected.

11. The computer-implemented method of claim 10, further comprising:

decrementing the counter in association with transmitting the resend message for the credit type.

12. The computer-implemented method of claim 5, wherein the rejection message to the requester includes the credit type indicating that a credit was granted for the transaction with the credit type.

13. The computer-implemented method of claim 5, wherein the resend message to the requester includes the credit type, and wherein the requester is configured to send the transaction again based on the credit type.

14. The computer-implemented method of claim 5, wherein the memory controller is coupled to an interconnect configured to store a plurality of transactions received from a set of source nodes.

15. The computer-implemented method of claim 14, wherein the requester is the interconnect, and the memory controller receives the transaction from the plurality of transactions stored in the interconnect.

16. The computer-implemented method of claim 14, wherein the requester is a source node from the set of source nodes.

17. The computer-implemented method of claim 14, wherein the interconnect uses a Coherent Hub Interface (CHI) protocol.

18. An integrated circuit device comprising:

an interconnect interface configured to communicate with a requester for transactions to access a memory, the memory comprising a plurality of memory banks;

a memory interface configured to communicate with the memory;

a scheduler configured to:

receive, via the interconnect interface, a transaction from the requester to access a first memory bank in the memory;

transmit, via the interconnect interface, a rejection message to the requester to reject the transaction, the transaction being associated with a credit type corresponding to the first memory bank;

transmit, via the interconnect interface, a resend message to the requester to resend the transaction when the credit type is being scheduled;

receive, via the interconnect interface, the transaction again from the requester when the credit type is currently being scheduled; and schedule the transaction to access the first memory bank via the memory interface; and a credit counter configured to count the rejected transaction corresponding to the credit type.

19. The integrated circuit device of claim 18, wherein each of the memory banks is associated with a different credit type.

20. The integrated circuit device of claim 18, wherein the requester is an interconnect coupled to a set of source nodes, and wherein the set of source nodes includes one or more of a processor, a peripheral device, a direct memory access (DMA) controller, or a coprocessor.

* * * * *